(12) United States Patent
Heidt et al.

(10) Patent No.: US 9,699,184 B2
(45) Date of Patent: Jul. 4, 2017

(54) METHOD AND DEVICE FOR PROCESSING DATA

(71) Applicant: Infineon Technologies AG, Neubiberg (DE)

(72) Inventors: Laurent Heidt, Munich (DE); Albrecht Mayer, Deisenhofen (DE)

(73) Assignee: Infineon Technologies AG, Neubiberg (DE)

( * ) Notice: Subject to any disclaimer, the term of this patent is extended or adjusted under 35 U.S.C. 154(b) by 92 days.

(21) Appl. No.: 14/483,645

(22) Filed: Sep. 11, 2014

(65) Prior Publication Data
US 2016/0080375 A1 Mar. 17, 2016

(51) Int. Cl.
*H04L 29/06* (2006.01)

(52) U.S. Cl.
CPC ...... *H04L 63/0876* (2013.01); *H04L 63/0823* (2013.01); *H04L 63/123* (2013.01); *G06F 2201/83* (2013.01)

(58) Field of Classification Search
CPC ......... H04L 63/12–63/126; B60W 2050/0006; B60W 2050/0292; B60W 2050/041; B60W 50/02
See application file for complete search history.

(56) References Cited

U.S. PATENT DOCUMENTS

| 5,599,344 | A | 2/1997 | Paterson | |
|---|---|---|---|---|
| 6,769,081 | B1 | 7/2004 | Parulkar | |
| 2006/0016877 | A1* | 1/2006 | Bonalle | G06Q 20/105 235/380 |
| 2006/0277244 | A1 | 12/2006 | Renno et al. | |
| 2007/0136361 | A1* | 6/2007 | Lee | G06F 21/64 |
| 2007/0147620 | A1* | 6/2007 | Zheng | H04L 63/06 380/277 |
| 2009/0177356 | A1* | 7/2009 | Plawecki | G05B 9/03 701/45 |
| 2010/0146277 | A1* | 6/2010 | Mochizuki | H04L 63/0428 713/169 |
| 2011/0055545 | A1* | 3/2011 | Sovio | G06N 5/02 713/150 |
| 2012/0159274 | A1 | 6/2012 | Balakrishnan et al. | |
| 2013/0268798 | A1* | 10/2013 | Schade | G06F 11/1487 714/3 |
| 2014/0181933 | A1* | 6/2014 | Sanjeev | H04L 63/0823 726/7 |
| 2014/0285191 | A1 | 9/2014 | Kalechofsky | |

(Continued)

OTHER PUBLICATIONS

Non Final Office Action Dated May 20, 2016 U.S. Appl. No. 14/483,716.

(Continued)

*Primary Examiner* — Farid Homayounmehr
*Assistant Examiner* — Zhimei Zhu
(74) *Attorney, Agent, or Firm* — Eschweiler & Potashnik, LLC (57) ABSTRACT

A method for processing data is suggested, and includes (i) conveying input data from a safety component to a security component, and (ii) calculating, at the security component, a second identifier based on the input data. The method further includes (iii) conveying the second identifier to the safety component, and (iv) verifying, at the safety component, a first identifier based on the second identifier.

24 Claims, 3 Drawing Sheets

(56) References Cited

U.S. PATENT DOCUMENTS

2015/0067328 A1* 3/2015 Yin .................... H04L 63/0807
                                                                                  713/168
2015/0175170 A1* 6/2015 Aoki ................... B60W 50/023
                                                                                  701/45

OTHER PUBLICATIONS

U.S. Appl. No. 14/483,716, filed Sep. 11, 2014.
Final Office Action Dated Jan. 13, 2017 U.S. Appl. No. 14/483,716.

\* cited by examiner

Fig.3

METHOD AND DEVICE FOR PROCESSING DATA

FIELD

Embodiments of the present disclosure relate to processing data, in particular in order to verify an identifier, e.g., signature, between a two components, in particular a safety component and a security component, wherein advantageously only the safety component may have to be designed to fulfil an automotive safety integrity level.

SUMMARY

A first embodiment relates to a method for processing data that comprises conveying input data from a safety component to a security component, and calculating, at the security component, a second identifier based on the input data. The method further comprises conveying the second identifier to the safety component, and verifying, at the safety component, a first identifier based on the second identifier.

A second embodiment relates to a device for processing data, comprising a safety component and a security component, wherein the safety component is arranged for conveying input data to the security component. The security component is configured to calculate a second identifier based on the input data and for conveying the second identifier to the safety component, and the safety component is configured to verify a first identifier based on the second identifier.

A third embodiment relates to a device comprising means for conveying input data from a safety component to a security component, and means for calculating, at the security component, a second identifier based on the input data. The device further comprises means for conveying the second identifier to the safety component, and means for verifying, at the safety component, a first identifier based on the second identifier.

A fourth embodiment is directed to a computer program product directly loadable into a memory of a digital processing device, comprising software code portions for performing the steps of the method described herein.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION

Automotive Safety Integrity Level (ASIL) is a risk classification scheme defined by the ISO 26262—Functional Safety for Road Vehicles standard, which is an adaptation of the Safety Integrity Level used in IEC 61508 for the automotive industry. The ASIL is established by performing a risk analysis of a potential hazard by looking at the Severity, Exposure and Controllability of the vehicle operating scenario. There are four ASILs identified by the standard: ASIL A, ASIL B, ASIL C, ASIL D. ASIL D dictates the highest integrity requirements on the product and ASIL A the lowest (see, e.g., http://en.wikipedia.org/wiki/Automotive_Safety_Integrity_Level).

A message authentication code (often MAC) is a short piece of information used to authenticate a message and to provide integrity and authenticity assurances on the message. Integrity assurances detect accidental and intentional message changes, while authenticity assurances affirm the message's origin. A MAC algorithm, sometimes called a keyed (cryptographic) hash function (however, cryptographic hash function is only one of the possible ways to generate MACs), accepts as input a secret key and an arbitrary-length message to be authenticated, and outputs a MAC (sometimes known as a tag). The MAC value protects both a message's data integrity as well as its authenticity, by allowing verifiers (who also possess the secret key) to detect any changes to the message content (see, e.g., http://en.wikipedia.org/wiki/Message_authentication_code). Also, a CMAC (Cipher-based MAC) is known as a block cipher-based message authentication code (see, e.g., http://en.wikipedia.org/wiki/Cmac).

It is noted that according to the examples provided herein, any hash function, cryptographic hash function or the like may be used to generate an identifier. Symmetric encryption (using, e.g., a common secret as key) or asymmetric encryption (using, e.g., public key cryptography) can be used to generate the identifier. The identifier may in particular be a digital signature.

Examples presented advantageously do not require a logic block or CPU subsystem that is developed according to the functional safety standard ISO26262 with ASIL A, B, C or D. The logic block or CPU can instead be developed according to a standard development process.

The logic block or the CPU subsystem may comprise security functionalities and is among others used to check an authenticity and integrity of a message or data stream. If the message or the data stream is safety related, then its authenticity and integrity may also be considered to be safety related, depending on the application. In this case the part of the logic block or CPU subsystem that relates to such a check may have to be developed according to the ISO 26262 standard with ASIL A, B, C or D.

Developments according to the ISO 26262 standard lead to an increase in complexity, costs, size of die and it generates additional power dissipation problems due to the increased number of hardware processing parts and additional software running on the security CPU.

The examples presented allow removing any safety related requirement with regard to checking the message authentication code from the security logic block or CPU subsystem while almost the whole security-relevant functionality remains in the logic block or CPU subsystem. Hence it allows keeping the complexity, die area and power consumption low.

This may be achieved by conducting the checking of the identifier, e.g., MAC, on a safe hardware by a safe software. Hence, a significant portion of steps can be done by a unsafe security software and on unsafe security hardware, wherein potential errors can be detected with a high probability by an independent safe logic block or safe CPU subsystem.

Figure 1:
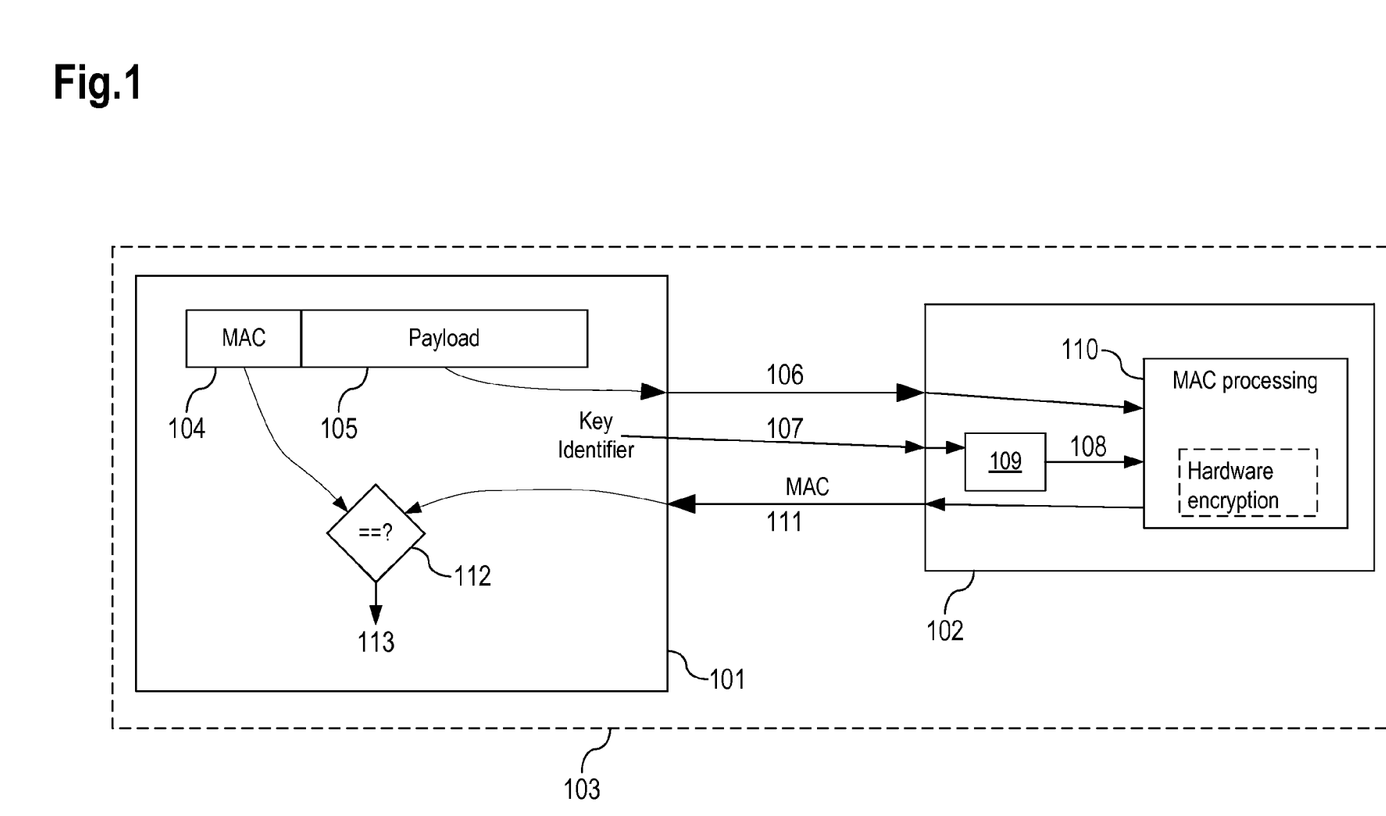
FIG. 1 shows an example diagram comprising a safety component and a security component, which may both be part of a microcontroller, wherein a first identifier obtained by the safety component is verified via the security component.

FIG. 1 shows an example diagram comprising a safety component (a block 101) and a security component (a block 102), which may both be part of a microcontroller 103, wherein a first identifier obtained by the safety component is verified via the security component. Each block 101, 102 may be a logic block or a CPU subsystem.

The block 101 may be a safe hardware (also referred to as safety component) executing a safe application, if necessary with the help of safe software. The block 102 may be an unsafe hardware executing an unsafe application (also referred to as security component), if required with the help of unsafe software. The block 102, however, may preferably be a security block providing security-relevant operations.

The security block may be (or comprise) a high security module (HSM) that performs cryptographic operations to obtain identifiers, e.g., cryptographic signatures.

For example, the microcontroller 103 may be an Aurix microcontroller, the block 101 may be a Tricore and the block 102 may be a Hardware Security Module (HSM).

The block 101 may receive an identifier, e.g., a MAC 104, from an external component (not shown in FIG. 1). This identifier needs to be verified (check of its validity and/or integrity).

In the example shown in FIG. 1, the MAC 104 refers to a payload 105 (any kind of information or data that may be subject to a message or received via a message). The block 101 needs to verify whether the MAC 104 is correct for the payload 105. The block 101 sends a request (for MAC) 106 to the block 102 including the payload 105. Also, the block 101 conveys a key identifier 107 to the block 102. The key identifier 107 allows the block 102 to select a key 108 from, e.g., a table 109 (or any kind of key storage). The block 102 comprises a MAC processing unit 110 which may optionally utilize hardware encryption. Based on the key 108 and the payload 105, a MAC 111 is determined by the MAC processing unit 110 and this MAC 111 is conveyed to the block 101.

The key identifier 107 may be obtained via a table provided in block 101 that comprises payload identifiers and corresponding key identifiers. The payload 105 may hence result in at least one key identifier 107 that is determined via such table and this at least one key identifier is conveyed to the block 102.

It is noted that the key identifier 107 and the request 106 may be combined in a single message or they may be conveyed via separate messages. It is also an option that the communication between the block 101 and the block 102 is achieved via inter-processor communication, a shared memory or a messaging mechanism of any kind. In this regard, "convey data" may be enable the addressee to obtain the data, be it via messages or any other communication concept (e.g., via a shared medium).

The block 101 compares (see compare unit 112) the MAC 104 with the MAC 111 in order to verify the MAC 104. If such verification is successful, a predefined action 113 based on the payload may be triggered. Otherwise, a different predefined action, e.g., alarm notification, may be triggered (not shown in FIG. 1).

Figure 2:
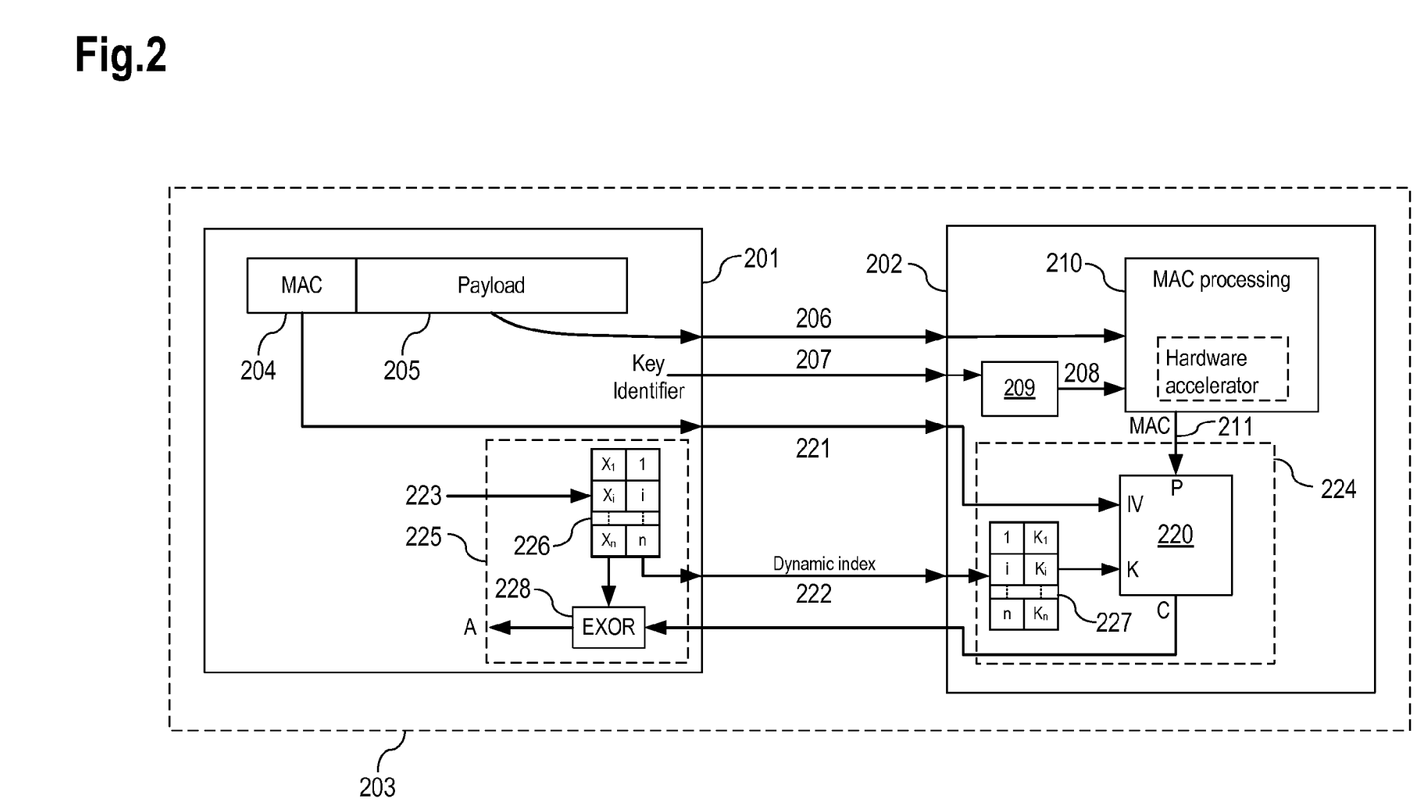
FIG. 2 shows a schematic diagram of an alternative solution.

FIG. 2 shows a schematic diagram of an alternative solution comprising a block 201 and a block 202, which may be both part of another component 203, e.g., a microcontroller. Each block 201, 202 is a logic block or a CPU subsystem. With regard to the blocks 201 to 203, reference is made to FIG. 1 above. In particular, the block 201 may be the safety component and the block 202 may be the security component (which does not have to fulfill predefined safety requirements).

The block 201 may receive an identifier, e.g., a MAC 204, from an external component (not shown in FIG. 2). This identifier needs to be verified. The solution shown in FIG. 2 allows verification of the MAC 204 using the block 202 while maintaining security and safety requirements.

In the example shown in FIG. 2, the MAC 204 refers to a payload 205 (any kind of information or data that may be subject to a message or received via a message). The block 201 needs to verify whether the MAC 204 is correct for the payload 205. The block 201 sends a request (for MAC) 206 to the block 202 including the payload 205. Also, the block 201 conveys a key identifier 207 to the block 202. The key identifier 207 allows the block 202 to select a key 208 from, e.g., a table 209 (or any kind of key storage). The block 202 comprises a MAC processing unit 210 which may optionally utilize hardware encryption. Based on the key 208 and the payload 205, a MAC 211 is determined by the MAC processing unit 210 (see also with regard to FIG. 1 above).

The MAC 211 is conveyed to a functional component 220. The functional component 220 may comprise hardware and/or software. It may in particular comprise a hardware accelerator for fast processing purposes. The functional component 220 may conduct a cryptographic operation, e.g., determine a value C based on the MAC 211 (also referred to as parameter P), an input vector IV and a key K. The functional component 220 may provide an AES-CBC algorithm (AES: Advanced Encryption Standard; CBC: Cipherblock chaining) for that purpose, i.e.:

$$C=\text{AES-CBC}(K,P,IV)=\text{AES}(K,P\oplus IV),$$

wherein "$\oplus$" refers to the logical exclusive-or (EXOR) operation.

The MAC 204 is provided (as a reference) from the block 201 to the block 202 (see connection 221). This MAC 204 is used as the input vector IV by the functional component 220 of the block 202.

The key K is also determined based on an information supplied by the block 201 as follows: For each request 206, a next index i is used (based on a select signal 223) to address an entry (Xi, i) in a table 226. The index i is conveyed as dynamic index 222 to the block 202 and it is used to select a key Ki corresponding to the index i from a table 227. This key Ki is used as the key K by the functional component 220.

The select signal 223 may not select the same index i for two consecutive MAC verification requests to ensure (with high likelihood) that the response (value C) coming back from the block 202 varies. Based on such variation, it is possible to detect stuck-at errors of the functional component 220: In case the functional component 220 supplies two identical values C in succession, this may reveal that the functional component 220 is stuck. The select signal 223 may in particular be independent from the incoming message comprising the MAC 204 and the payload 205. For example, the select signal 223 may be incremented with each MAC verify request modulo the size of the table 226.

The value C (result of the operation conducted by the functional component 220) is conveyed from the block 202 to the block 201, wherein it is EXOR-combined (see block 228) with the entry Xi (that corresponds to the dynamic index i that was previously selected and conveyed to the block 202). A result A of the EXOR operation 228 indicates the integrity and the authenticity of the MAC 204, i.e. whether the MAC 204 could be confirmed by the block 202.

The entry Xi, the key Ki and the result A each may comprise a predetermined number of bits, e.g., 128 bits.

A block 225 combines elements of an algorithm (which may use dedicated and/or general hardware) to produce the result A based on the select signal 223 and the value C obtained from the block 202. A block 224 combines elements of an algorithm (which may use dedicated and/or general hardware) to produce the value C based on the dynamic index 222, the MAC 204 provided from the block 201 and the MAC 211 determined by the MAC processing unit 210.

Hence, an advantage of the example shown in FIG. 2 is that the safety requirements are fulfilled (stuck-at fault of the functional component 220 can be determined) and the security aspect is improved.

The additional dynamic index 222 allows detecting a failure mode within the block 224 in case it always returns the same value. Due to the dynamic index 222, the correct value returned by the block 202 is not constant; hence, any "stuck-at" fault of the block 224 is visible for the block 201 (i.e. in case the block 202 supplies two (or more) identical values C in succession, the block 201 may assume a stuck-at fault of the functional component 220).

In addition, the algorithm supplied by the block 224 may be arranged such that it is not feasible to retrieve the MAC value 211 from any of the following: the MAC 204, the dynamic index 222, the value C and from the payload 205.

Figure 3:
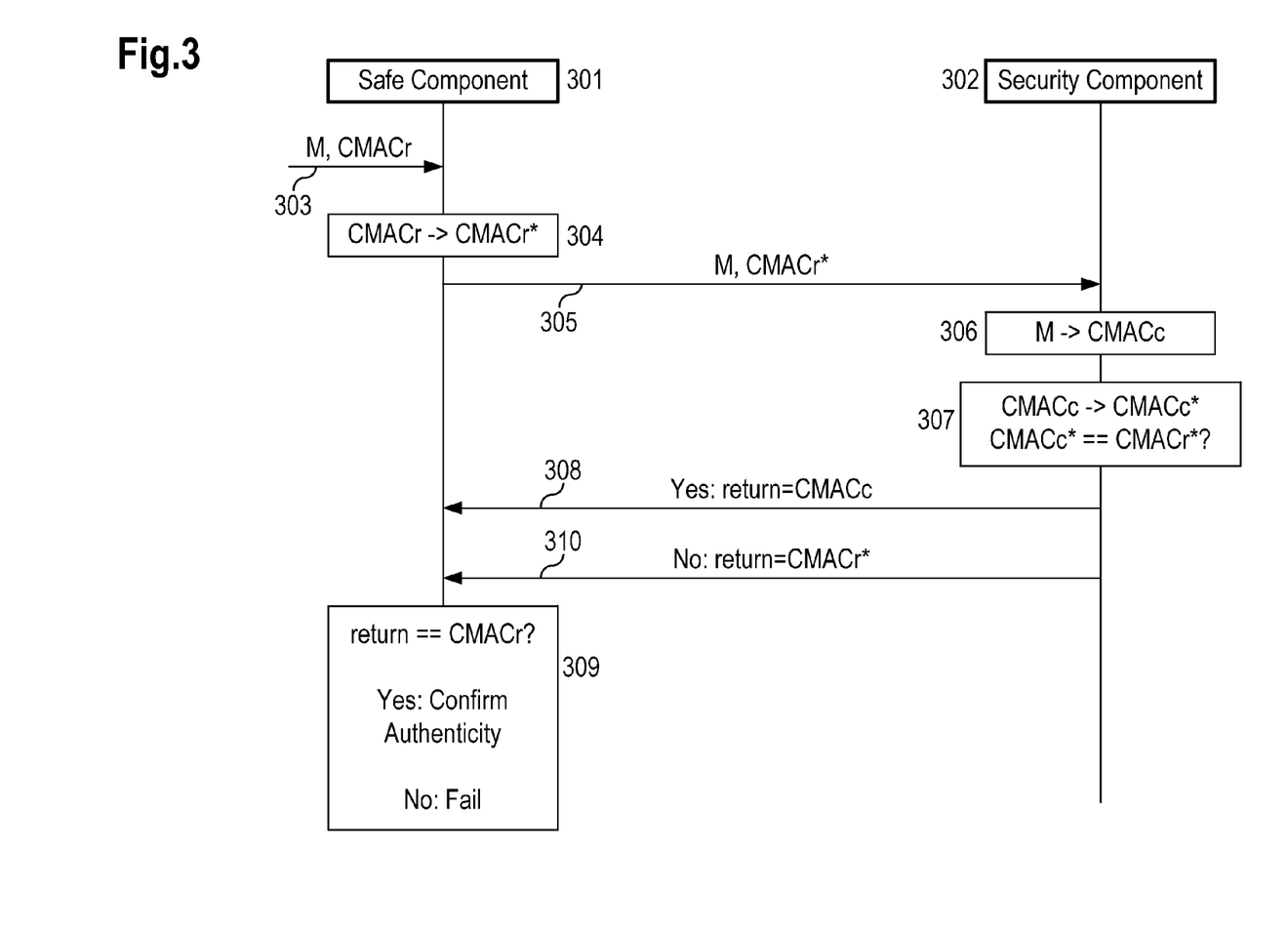
FIG. 3 shows a schematic flow diagram of a method that conveys the MAC value or any MAC value that may be based on the actual MAC value only in case the security component successfully verified its validity.

FIG. 3 shows a schematic flow diagram of a method that conveys the MAC value or any MAC value that may be based on the actual MAC value only in case the security component successfully verified its validity.

FIG. 3 depicts a block 301 and a block 302, which may be both part of another component, e.g., a microcontroller (not shown in FIG. 3). Each block 301, 302 is a logic block or a CPU subsystem. With regard to the blocks 301 and 302, reference is made to FIG. 1 and FIG. 2 above. In particular, the block 301 may be the safety component and the block 302 may be the security component (which does not have to fulfill predefined safety requirements).

Hereinafter, the acts shown in FIG. 3 are described in further detail:
(a) At 303, a message comprising a payload M and a MAC CMACr is received at the block 301.
(b) At 304, the block 301 converts the MAC CMACr into a MAC CMACr*. This may be achieved utilizing an algorithm that may not significantly change the information content of the MAC CMACr, but it may change at least one bit, e.g., provide a bit-wise complement, a circular bit shift, a combination of both or the like.
(c) At 305, the block 301 conveys the payload M and the MAC CMACr* to the block 302.
(d) At 306, the block 302 calculates a MAC CMACc based on the payload M with its own secure key.
(e) At 307, the block 302 converts the MAC CMACc into a MAC CMACc* according to the same algorithm that was used by the block 301 to obtain the MAC CMACr* from the MAC CMACr. Then, the block 302 compares the MAC CMACc* with the MAC CMACr* obtained from the block 301.
It is an option to convert the MAC CMACr* obtained from the block 301 back into the MAC CMACr and compare the MAC CMACr with the MAC CMACc (in act 307). This may in particular be beneficial in case the algorithm that led to the MAC CMACr* is reversible.
(f) If the comparison shows identity of both MACs, the block 302 conveys (see act 308) the MAC CMACc back to the block 301. The block 301 may then compare (see act 309) the MAC CMACc with the MAC CMACr thereby confirming the authenticity of the MAC CMACr.
(g) If the comparison at act 307 does not show identity of both MACs, the block 302 does not make the MAC CMACc available to the block 301. Instead, at 310, the block 302 may convey any data, that will lead to a fail of the comparison conducted at 309 at the block 301. For example, the block 302 may convey the MAC CMACr*, which will definitely fail the comparison at 309.

Hence, the comparison at 307 determines whether the calculated MAC CMACc is to be made available to the block 301 or not. The comparison at 307 may be restricted to a reduced number of bits, if, e.g., the MAC CMACr does not contain all bits of the MAC.

It is also an option that the MAC CMACc conveyed at 308 to the block 301 may contain all bits of the MAC or a reduced number of bits. It may in particular be an option that only those bits of the MAC are conveyed as MAC CMACc at 308, which are required for the comparison at 309.

The transmitted MAC CMACr may only be a fraction, e.g. 16 bits, of a MAC calculated with AES which is always 128 bits. Either the width of the CMAC is pre-defined or the block 301 provides the width to the block 302 as a parameter. This may be applicable for the options described.

The CMACc may include all bits, but it may be a sufficient and more secure option for the security hardware to merely output the bits that are needed for the CMACc/CMACr comparison by the safe hardware.

It is an advantage that the MAC CMACr is not conveyed from the block 301 to the block 302. Hence, this MAC value cannot by mistake or unintentionally be conveyed from the block 302 to the block 301. If the value of the MAC CMACr is made available by the block 302, this is a strong indication that the block 302 successfully determined the correct MAC. In other words, the MAC CMACc is only output by the block 302 if the MAC CMACr* was received and processed.

Hence, as an advantage, the security hardware (security component 302) may not need to fulfill costly safety requirements. The safety aspects may well be covered by the block 301.

With regard to the example scenario described above, the following example may be utilized:
(a) At 303, the message comprising the payload M and a 32 bit MAC CMACr (also referred to as CMAC32r) of a 128 bit MAC is received at the block 301.
(b) At 304, the block 301 converts the MAC CMAC32r with a single 32 bit circular bit shift into a 32 bit MAC CMAC32r*. A bit shift may be used, because applying such operation will not result in the original value except for the two numbers (out of $2^{32}$) all being either ones or zeroes.
(c) At 305, the block 301 conveys the payload M and the MAC CMAC32r* to the block 302 and may trigger processing by the block 302.
(d) At 306, the block 302 sets a result register or RAM address with the content of the MAC CMAC32r* (this may be beneficial as a default in case of any error). The block 302 then calculates a MAC CMAC128c and truncates it to obtain a MAC CMAC32c. Truncating may be achieved by cutting off the MAC.
(e) At 307, the block 302 converts the MAC CMAC32c by a circular bit shift into a MAC CMAC32c* and compares it to the MAC CMAC32r*.
(f) If the MAC CMAC32c* and the MAC CMAC32r* are equal, the block 302 writes the MAC CMAC32c to the result register or RAM address. The block 302 may notify the block 301, e.g., via interrupt, that a result of the comparison is available. The block 301 may then access the result register or RAM address to obtain the result of the comparison.

It is noted that the block 301 may also apply a polling mechanism to obtain the result of the comparison. It is further an option that the process is controlled by a (separate, e.g., safe) timer.

The block 301 may then compare (see act 309) the MAC CMAC32c with the MAC CMAC32r and confirm the authenticity of the MAC CMAC32r.

The examples suggested herein may in particular be based on at least one of the following solutions. In particular combinations of the following features could be utilized in order to reach a desired result. The features of the method could be combined with any feature(s) of the device, apparatus or system or vice versa.

A method is provided for processing data comprising conveying input data from a safety component to a security component, and calculating, at the security component, a second identifier based on the input data. The method further comprises conveying the second identifier to the safety component, and verifying, at the safety component, a first identifier based on the second identifier.

As an example, the MAC may be returned to the safety component. The first identifier may be a MAC at the safety component and the second identifier may be a MAC calculated and supplied by the security component.

The safety component and the security component may each be a piece of hardware, an integrated circuit, a microcontroller, a processor, an FPGA, an ASIC or the like. Each of these components may comprise software (or firmware) to conduct the operations as described herein.

Conveying or supplying data in this regard in particular refers to making data available for an addressee. Accordingly, the addressee may obtain data from another component that made it available.

This may be achieved by actively pushing data, e.g., sending data, e.g., via messages, between components. As an alternative, the data may be polled from an addressee or from any other (shared) medium, e.g., a shared memory. For example, inter-processor communication of various kinds can be used to "convey" data from a sending component to a receiving component. It is also an option that the components are connected via a connection, a bus or a network. Such connection can be used to convey the data between the components.

The safety component may also be regarded as a first component and the security component may be regarded as a second component. Both components may utilize a communication scheme to convey data. Also, each component may comprise processing capabilities to conduct the described operation(s).

The respective identifier may be based on a cryptographic algorithm (coding scheme) using symmetric or asymmetric cryptography. The identifier may in particular be or comprise a signature.

The approach presented herein allows the safety component to verify the first identifier by conveying it to the security component (e.g., a security module or a security processor) and by receiving the second identifier from the security component. The safety component verifies the first identifier based on this second identifier. The decision about the validity and integrity of the first identifier is made by the safety component, the security component may advantageously be used to supply an intermediate result.

It is noted that the second identifier may be a result of a cryptographic algorithm or it may be a piece of information that allows the safety component to verify the first identifier.

The verification conducted by the safety component may cover validity and authenticity of the first identifier.

In addition, the approach presented allows revealing a stuck-at fault at the security component or at its interface. Hence, the solution advantageously allows for "checking the checker" (i.e. the security processor).

In an embodiment, the safety component fulfills a safety integrity level, in particular an automotive safety integrity level.

The safety component may in particular fulfil an ASIL based on a standardized specification, e.g., ASIL A, ASIL B, ASIL C or ASIL D.

In an embodiment, the security component provides cryptographic operations and does not fulfill a safety integrity level.

It is hence an option that the security component does not have to fulfil any ASIL.

In an embodiment, the first identifier and the second identifier are each based on a hash function, in particular on a cryptographic hash function.

For example, a MAC or a CMAC may be used as cryptographic hash function. Also, one-way functions of any kind may be used. Symmetric or asymmetric (public-key cryptography) keys may be used to calculate the respective identifier.

In an embodiment, the method further comprises at the safety component, comparing the second identifier with the first identifier.

In an embodiment, the method further comprises conducting a first action if the first identifier is the same as the second identifier, and conducting a second action if the first identifier is not the same as the second identifier.

The first action may be a predefined action based on the input data (also referred to as payload) that may have been received by the safety component along with the first identifier. The second action may comprise, an alarm notification, an error indication or the like.

In an embodiment, the first identifier and the input data were obtained from an external component.

The first identifier may be obtained together with the input data (also referred to as payload), e.g., via a message or via a shared memory, from such external component. The first identifier may correspond at least to a portion of said payload, e.g., be a hash value corresponding to said payload (or a portion thereof). Hence, successfully verifying the first identifier allows the safety component to conduct an action that is based on this payload, e.g., execute a command as indicated by the payload.

In an embodiment, the safety component and the security component are arranged on at least one device.

Said device may in particular be or comprise a microcontroller, an FPGA, an ASIC, a processor or the like.

In an embodiment, the method further comprises calculating the second identifier at the security component based on the input data and based on a key.

In an embodiment, the method further comprises an option wherein the key is determined based on a key identifier supplied by the safety component.

In an embodiment, the method further comprises calculating, at the security component, the second identifier based on the input data, a first key, an input vector and a second key.

Hence, the second identifier may be a value C as a result of a cryptographic operation. The first identifier may be a dynamic entry (provided via a memory portion or table, e.g., said entry Xi of table 226) that may be processed, e.g., via an XOR operation, with the second identifier. The first identifier changes for each verification request, which allows to supply a dynamic aspect which would reveal stuck-at faults at the security component. The dynamic aspect (not the entry Xi) may be conveyed, e.g. as the dynamic index to the security component. This dynamic index may be used to address a key that may be used as said second key. Hence, the first identifier can be verified by the safety component without having to convey the value of the first identifier between the safety component and the security component.

In an embodiment, the first key is determined based on a key identifier supplied by the safety component.

In an embodiment, the second key is determined on a dynamic index supplied by the safety component.

In an embodiment, the method further comprises verifying, at the safety component, the first identifier based on the second identifier by processing a predefined value determined by the dynamic index with the second identifier provided by the security component.

In an embodiment, calculating the second identifier comprises calculating a third identifier based on the input data and the first key, and calculating the second identifier based on the third identifier, the second key and the input vector.

The input vector may be a based on a hash function, in particular a cryptographic hash function. The input vector may be a MAC or a CMAC of the payload data (input data).

Hence, the security component may internally produce the third identifier that may advantageously as such not leave the security component. In case of a successful verification of the first identifier at the safety component, this third identifier may correspond to the input vector. However, the processing at the security component uses the third identifier together with the above mentioned parameters (input vector, second key) to convey the second identifier to the safety component, wherein the second identifier may dynamically change and in particular not be the same for two (or more) successive verification requests. Hence, stuck-at faults at the security may become apparent when two or more second identifiers that are issued in succession showing the same value.

In an embodiment, the second identifier is calculated based on an AES function, in particular an AES-CBC function.

In an embodiment, the method further comprises conveying the input data and a fourth identifier, which is determined based on a predetermined operation applied to the first identifier, from the safety component to the security component, and calculating, at the security component, a third identifier based on the input data. The method further comprises comparing, at the security component, either a modified fourth identifier with the third identifier, or the fourth identifier with a modified third identifier, wherein the third identifier is conveyed as the second identifier from the security component to the safety component in case the comparison confirmed that either the modified fourth identifier and the third identifier are the same or the fourth identifier and the modified third identifier are the same.

It is noted that the comparison of either the modified fourth identifier with the third identifier or the fourth identifier with the modified third identifier may be chosen alternatively. It is in particular an option to implement one or the other alternative, in particular not both at the same time.

Hence, the safety component compares the second identifier obtained from the security component with the first identifier; in case they match, the safety component can successfully verify the first identifier.

In an embodiment, the predetermined operation may comprise at least one of the following: a bit-wise complement, and a circular bit shift.

In an embodiment, the modified fourth identifier is determined based on an inverse of the predetermined operation.

In an embodiment, the modified third identifier is determined based on the predetermined operation.

In an embodiment, an information different from the third identifier is conveyed as the second identifier from the security component to the safety component in case the comparison did not confirm that either the modified fourth identifier and the third identifier are the same or the fourth identifier and the modified third identifier are the same.

In an embodiment, the information different from the third identifier is the fourth identifier.

A device for processing data is provided, the device comprising a safety component and a security component, wherein the safety component is configured to convey input data to the security component. Further, the security component is configured to calculate a second identifier based on the input data and for conveying the second identifier to the safety component, and the safety component is configured to verify a first identifier based on the second identifier.

In an embodiment, the device is at least one of the following: a microcontroller, an FPGA, an ASIC, and a processor.

In an embodiment, the safety component fulfills a safety integrity level, in particular an automotive safety integrity level, and the security component provides cryptographic operations and does not fulfill a safety integrity level.

A computer program product is provided that directly loadable into a memory of a digital processing device, comprising software code portions for performing the steps of the method as described herein.

Also, a device is suggested, the device comprising means for conveying input data from a safety component to a security component, and means for calculating, at the security component, a second identifier based on the input data. The device further comprises means for conveying the second identifier to the safety component, and means for verifying, at the safety component, a first identifier based on the second identifier.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various example embodiments of the disclosure have been disclosed, it will be apparent to those skilled in the art that various changes and modifications can be made which will achieve some of the advantages of the disclosure without departing from the spirit and scope of the disclosure. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the disclosure may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A method for processing data, comprising:
    conveying input data from a safety component to a security component;
    calculating, at the security component, a second identifier based on the input data;
    conveying the second identifier to the safety component;
    verifying, at the safety component, a first identifier based on the second identifier;
    conveying the input data and a fourth identifier, which is determined based on a predetermined operation applied to the first identifier, from the safety component to the security component;
    calculating, at the security component, a third identifier based on the input data; and
    comparing, at the security component, either a modified fourth identifier with the third identifier or the fourth identifier with a modified third identifier,
    wherein the third identifier is conveyed as the second identifier from the security component to the safety component in case the comparison confirmed that either the modified fourth identifier and the third identifier are the same or the fourth identifier and the modified third identifier are the same.

2. The method according to claim 1, wherein the safety component fulfills a safety integrity level, in particular an automotive safety integrity level.

3. The method according to claim 1, wherein the security component provides cryptographic operations and does not fulfill a safety integrity level.

4. The method according to claim 1, wherein the first identifier and the second identifier are each based on a hash function, in particular on a cryptographic hash function.

5. The method according to claim 1, further comprising:
    at the safety component, comparing the second identifier with the first identifier.

6. The method according to claim 1, further comprising:
    conducting a first action if the first identifier is the same as the second identifier; and
    conducting a second action if the first identifier is not the same as the second identifier.

7. The method according to claim 1, wherein the first identifier and the input data are obtained from an external component.

8. The method according to claim 1, wherein the safety component and the security component are arranged on at least one device.

9. The method according to claim 1, further comprising:
    calculating the second identifier at the security component based on the input data and based on a key.

10. The method according to claim 1, further comprising:
    wherein a key is determined based on a key identifier supplied by the safety component.

11. The method according to claim 1, further comprising:
    calculating, at the security component, the second identifier based on the input data, a first key, an input vector and a second key.

12. The method according to claim 11, wherein the first key is determined based on a key identifier supplied by the safety component.

13. The method according to claim 11, wherein the second key is determined on a dynamic index supplied by the safety component.

14. The method according to claim 13, further comprising:

verifying, at the safety component, the first identifier based on the second identifier by processing a predefined value determined by the dynamic index with the second identifier provided by the security component.

15. The method according to claim 11, wherein the second identifier is calculated based on an AES function, in particular an AES-CBC function.

16. The method according to claim 1, wherein the predetermined operation may comprise at least one of the following:
    a bit-wise complement, and
    a circular bit shift.

17. The method according to claim 1, wherein the modified fourth identifier is determined based on an inverse of the predetermined operation.

18. The method according to claim 1, wherein the modified third identifier is determined based on the predetermined operation.

19. The method according to claim 1, wherein an information different from the third identifier is conveyed as the second identifier from the security component to the safety component in case the comparison did not confirm that either the modified fourth identifier and the third identifier are the same or the fourth identifier and the modified third identifier are the same.

20. The method according to claim 19, wherein the information different from the third identifier is the fourth identifier.

21. A computer program product comprising a non-transitory computer-readable media having instructions thereon that are directly loadable into a memory of a digital processing device, the instructions comprising software code portions for performing the steps of the method according to claim 1.

22. A device for processing data, comprising a safety component and a security component,
    wherein the safety component is configured to convey input data to the security component;
    wherein the security component is configured to calculate a second identifier based on the input data and convey the second identifier to the safety component;
    wherein the safety component is configured to verify a first identifier based on the second identifier;
    wherein the safety component is configured to convey the input data and a fourth identifier, which is determined based on a predetermined operation applied to the first identifier, to the security component;
    wherein the security component is configured to calculate a third identifier based on the input data, and compare either a modified fourth identifier with the third identifier or the fourth identifier with a modified third identifier, and
    wherein the security component is configured to convey the third identifier as the second identifier to the safety component in case the comparison confirmed that either the modified fourth identifier and the third identifier are the same or the fourth identifier and the modified third identifier are the same.

23. The device according to claim 22, wherein the device is at least one of the following: a microcontroller, an FPGA, an ASIC, a processor.

24. The device according to claim 22,
    wherein the safety component fulfills a safety integrity level, in particular an automotive safety integrity level; and
    wherein the security component provides cryptographic operations and does not fulfill a safety integrity level.

* * * * *